United States Patent
Laksin et al.

(10) Patent No.: US 8,109,211 B2
(45) Date of Patent: Feb. 7, 2012

(54) METHOD OF GRAVURE PRINTING WITH LIQUID RADIATION CURABLE INKS

(75) Inventors: Mikhail Laksin, Boonton, NJ (US); Subhankar Chatterjee, Hampton, NJ (US); Kenneth A. Fontaine, Pawcatuck, CT (US)

(73) Assignees: Ideon LLC, Hillsborough, NJ (US); Amgraph Packaging, Inc., Versailles, CT (US)

( * ) Notice: Subject to any disclaimer, the term of this patent is extended or adjusted under 35 U.S.C. 154(b) by 345 days.

(21) Appl. No.: 12/409,701

(22) Filed: Mar. 24, 2009

(65) Prior Publication Data

US 2010/0242757 A1    Sep. 30, 2010

(51) Int. Cl.
*B41M 1/18* (2006.01)
(52) U.S. Cl. .......................... 101/211; 101/491; 101/177
(58) Field of Classification Search .................. None
See application file for complete search history.

(56) References Cited

U.S. PATENT DOCUMENTS

| | | | | |
|---|---|---|---|---|
| 4,927,663 A | 5/1990 | Small et al. | ...................... | 427/40 |
| 5,690,028 A | 11/1997 | Schick | .......................... | 101/211 |
| 6,011,078 A | 1/2000 | Reich et al. | ...................... | 522/86 |
| 6,772,683 B2 | 8/2004 | Laksin et al. | .................. | 101/211 |
| 6,803,112 B1 | 10/2004 | Chatterjee et al. | ............ | 428/458 |
| 2003/0154871 A1 | 8/2003 | Laksin et al. | .................. | 101/211 |
| 2006/0165997 A1 | 7/2006 | Tevis et al. | ................. | 428/411.1 |
| 2008/0233306 A1 | 9/2008 | Turgis et al. | .................. | 427/511 |

FOREIGN PATENT DOCUMENTS

| | | |
|---|---|---|
| CN | 101 134 864 | 3/2008 |
| DE | 197 16 261 | 10/1998 |
| WO | WO 03093378 A1 * | 11/2003 |
| WO | WO 2005/056702 | 6/2005 |

* cited by examiner

*Primary Examiner* — Joshua D Zimmerman
(74) *Attorney, Agent, or Firm* — Roberts & Roberts, LLP

(57) ABSTRACT

The invention relates to a gravure printing ink and a method of multi-color gravure printing on flexible substrates with liquid radiation curable inks. Individual colors are transferred via direct contact between engraved gravure cylinder and a substrate. Each color is dried such that the sequentially printed ink layers transfer through the press without distortion of the printed image during multiple web turns around turn bars. Finally the printed substrate is cured by exposing an electron beam unit. The gravure printing ink comprises an admixture of a) a water dispersible pigment; b) a water dispersible, ethylenically unsaturated monomer, ethylenically unsaturated oligomer or ethylenically unsaturated polymer which is polymerizable or crosslinkable by the application of sufficient electron beam radiation; c) a defoaming agent; d) sufficient water to form a dispersion with components a), b) and c), which dispersion has a viscosity of from about 25 cps to about 200 cps.

16 Claims, 2 Drawing Sheets

METHOD OF GRAVURE PRINTING WITH LIQUID RADIATION CURABLE INKS

BACKGROUND OF THE INVENTION

1. Field of the Invention

The present invention relates to a gravure printing ink as well as a method of multi-color gravure printing on flexible substrates with liquid radiation curable inks, where individual colors are transferred via direct contact between engraved gravure cylinder and the substrate. Each color is dried at an elevated temperature, such that the sequentially printed ink layers transfer through the press without any distortion of the printed image during multiple web turns around turn bars; and finally curing the printed substrate by exposing it to an electron beam (EB) unit.

2. Description of the Related Art

There are three main printing methods used in commercial, high volume printing today, namely offset lithography, gravure and flexography. From a quality standpoint both offset and gravure printing methods are superb and comparable, followed by flexography. In terms of printing mechanism, with both offset and flexography an inked image is transferred from a printing plate containing the image to be printed, to a substrate via an intermediate rubber blanket. In gravure printing, however, the image is transferred directly from an anilox cylinder containing the image to be printed, to the substrate. Inks used for the three printing methods are also very different, primarily in terms of viscosity and pigment concentrations. At room temperature, offset inks have a paste consistency (~10,000 Poise). Flexo inks have consistency of honey (~500 centipoises); while gravure inks have very low viscosity (~50 centipoises).

One of the problems with printing ink formulations is the presence of volatile organic compounds (VOC) in them. This makes the inks subjected to regulation by the EPA and creates a source of additional expenses for the printers. Over the last two decades a certain percentage of the inks used in offset and flexo printing markets have been formulated with VOC free energy curable, ultraviolet (UV) and electron beam (EB) materials. These inks require exposure only to an UV light or an EB unit for instant curing, as opposed to requiring radiant heat sources for drying. The crosslinking associated with the curing process imparts the well known benefits of energy curing, e.g., product and abrasion resistance; high gloss; instant processibility, etc. In comparison, gravure inks are made with either solvents (acetates, alcohols etc.) or water in order to maintain a very low viscosity. However, because of extremely high surface tension (78 dynes) of water, and related substrate wetting and printability problems, water based gravure inks typically contain up to 30% of solvents, in order to lower the surface tension of the inks. So far gravure inks remain a source of VOC emission and require appropriate environmental control for all printers using this printing method. This invention provides a gravure printing method without having any VOC emission restriction.

Typically in gravure printing processes, different colors are printed from one printing station to the next. At each printing station, a gravure cylinder containing the image to be printed is transferred onto a substrate through direct contact. A printed web travels through a drier (typically forced hot air drier) where the VOC component of the ink is evaporated and captured for subsequent processing. The printed web then travels to the next printing station and the process is repeated following the desired color sequence. Once all the colors are printed, the web is passed through a long drier for complete ink drying. For absorbent substrates, e.g., paper, the drying must be good enough to minimize the presence of residual solvents. Whereas for non-absorbent substrates, e.g., film, the drying must be good enough for the printed image not to smear and/or back transfer. For food packaging applications such controls are essential. The evaporated solvents during the drying process are either captured through chilling equipment and recycled or are burned off through adequate thermal oxidizing equipment before exhausting, following appropriate EPA guidelines.

Gravure printing itself is a century old art and is widely used by printers throughout the world. However, use of energy curable inks with gravure viscosity, containing no VOC and the printed image cured instantly upon exposure to an EB unit at the end of the print line is new. Printing with energy curable liquid inks are known. U.S. Pat. No. 6,772,683 describes wet trapping of energy curable liquid inks on a central impression (CI) flexographic press. At each printing station liquid ink is transferred from an anilox roller to a printing plate containing the image to be printed; which in turn transfers the image onto a flexible substrate, compared to a direct transfer from an anilox roller to the substrate in case of gravure printing. In between two subsequent printing stations the water contained in the ink formulations naturally evaporates just enough for the printed image layer to raise its viscosity slightly higher than the next oncoming ink layer, such that the next ink layer can wet trap over the previous one. The ink formulations containing water are specifically designed where the water forms a single phase or homogeneous solution and not a multi-phase dispersion. Therefore only water soluble components can be used in the ink compositions which would form a homogeneous, single phase system and not a heterogeneous or multiphase system. Such compositions and processes are described in U.S. patent application 2008/0233306 A1, and U.S. Pat. Nos. 6,803,112 and 6,011,078. The wet trapped ink layers are exposed to an EB source at the end of the printing process to completely cure the printed matter. The limitation of the process, however, is that wet trapping is only possible where the multiple ink layers do not face a hard surface, e.g., a turn bar on the press, until they are completely cured with an EB. Any such contact prior to EB curing would simply rub off or smear the image onto such a hard rollers, as the ink layers, although capable of wet trapping, are not dry enough to withstand any abrasive surface. As a result, the printing process is restricted to a CI-flexographic printing process only where there are no turn bars on the press, until after the EB unit.

U.S. patent publication 2006/0165997 describes a method for making lottery tickets with improved surface protection and security features, where multiple layers of full coatings are applied onto each other; drying each coating layer with hot air or IR in between each coating station; and finally exposing to an EB unit at the end of the press to completely cure all the coating layers. There is no image on image application.

The present invention describes a gravure printing method which essentially eliminates the volatile solvents present in the gravure inks, and hence will not require any of the VOC controlling equipment required by the EPA. The invention discloses a gravure printing method with EB curable liquid inks having the required viscosity, which are dried, e.g. by a forced hot air drier at each printing station and at the end, the completely printed web is exposed to an EB unit for complete curing of the printed image. An EB curable overprint varnish or adhesive may be applied over the dried printed image and the composite structure cured together by exposure to the EB unit. The method allows gravure printing with its original quality; without any VOC or residual solvent issues; and with all the associated improvements offered by energy curable inks.

SUMMARY OF THE INVENTION

The invention provides a gravure printing ink which comprises an admixture of:
a) a water dispersible pigment;
b) a water dispersible, ethylenically unsaturated monomer, ethylenically unsaturated oligomer or ethylenically unsaturated polymer which is polymerizable or crosslinkable by the application of sufficient electron beam radiation;
c) a defoaming agent;
d) sufficient water to form a dispersion with components a), b) and c), which dispersion has a viscosity of from about 25 cps to about 200 cps.

The invention also provides method of printing which comprises:
I. applying an imaged layer of a gravure printing ink onto a surface of a substrate, which gravure printing ink comprises an admixture of:
a) a water dispersible pigment;
b) a water dispersible, ethylenically unsaturated monomer, ethylenically unsaturated oligomer or ethylenically unsaturated polymer which is polymerizable or crosslinkable by the application of sufficient electron beam radiation;
c) a defoaming agent;
d) sufficient water to form a dispersion with components a), b) and c), which dispersion has a viscosity of from about 25 cps to about 200 cps; then
II. drying the imaged layer of gravure printing ink on the substrate; and then
III. exposing said imaged layer of gravure printing ink with sufficient electron beam radiation to cause the ethylenically unsaturated monomer, ethylenically unsaturated oligomer or ethylenically unsaturated polymer in said imaged layer to polymerize or crosslink.

The invention optionally further comprises sequentially conducting steps I and II, one or more additional times before conducting step III, by applying onto the prior imaged layer of dry gravure printing ink and onto the same surface of the substrate, an imaged layer of another gravure printing ink, which gravure printing ink comprises an admixture of:
a) a water dispersible pigment;
b) a water dispersible, ethylenically unsaturated monomer, ethylenically unsaturated oligomer or ethylenically unsaturated polymer which is polymerizable or crosslinkable by the application of sufficient electron beam radiation;
c) a defoaming agent;
d) sufficient water to form a dispersion with components a), b), c) and d), which dispersion has a viscosity of from about 25 cps to about 200 cps.

DESCRIPTION OF THE INVENTION

Figure 1:
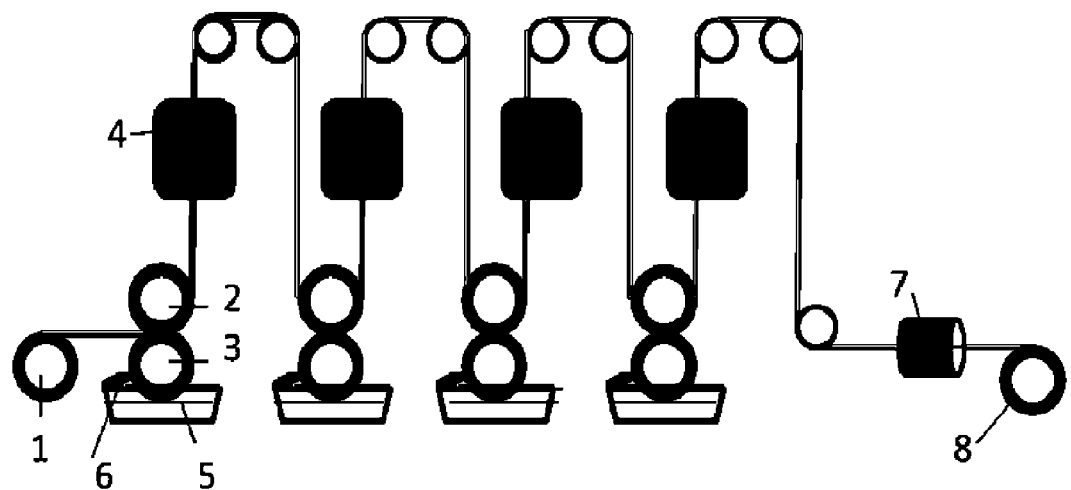
FIG. 1 illustrates a four color EB gravure printing press.

The first component of the gravure printing ink is a water dispersible pigment. Any suitable water dispersible pigment may be used without limitation so long as the colorant is dispersible with the other composition components. Pigments can be an organic pigment, an inorganic pigment, a metallic pigment, an electrically conductive pigment, a magnetically active pigment, a nanopigment, a dielectric pigment, a light absorbing pigment, or combinations thereof. Examples of suitable pigments include Suitable pigments include but are not limited to monoazo yellows, monoarylide yellows, diarylide yellows, naphthol reds, rubine reds, lithol rubines, phtalocyanine blues, and carbon black. Suitable pigments include, but are not limited to Pigment Yellow 1, Pigment Yellow 3, Pigment Yellow 11, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57:1, Pigment Red 112, Pigment Red 170, Pigment Red 210, Pigment Red 238, Pigment Red 269, Pigment Blue 15, Pigment Blue 15:1, Pigment Blue 15:2, Pigment Blue 15:3, Pigment Blue 15:4, Pigment Green 7, Pigment Green 36, Pigment violet 23, and Pigment Black 7, and the like, or combinations thereof. For this invention the term water dispersible pigment includes conductive or non-conductive particles to create printed images with conductive or dielectric properties. This includes a conductive powder such as a metal powder of iron, silver, copper aluminum or their alloys, a metal oxide powder, a metal carbide powder, a metal boride powder, carbon black, graphite or combinations thereof. In one embodiment, the water dispersible pigment may be present in the gravure ink composition in an amount of from about 4 to about 10 weight percent based on the weight of the overall gravure ink composition. In another embodiment, the colorant may be present in an ink composition in an amount of from about 5 to about 8 weight percent based on the weight of the overall gravure ink composition. The gravure printing ink may optionally additionally contain a dye component as a colorant.

The gravure printing ink then comprises an unsaturated oligomer or ethylenically unsaturated polymer which is polymerizable or crosslinkable by the application of sufficient electron beam radiation. Such ethylenically unsaturated monomers, ethylenically unsaturated oligomers or ethylenically unsaturated polymers are exemplified by an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof. Useful ethylenically unsaturated compounds non-exclusively include an ethylenically unsaturated monomer, ethylenically unsaturated oligomer or ethylenically unsaturated polymer. Preferred ethylenically unsaturated compounds non-exclusively include an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof. These include epoxy acrylates, polyether acrylates, polyurethane acrylates, polyester acrylates, and ethoxylated or propoxylated di- or multi-functional acrylates. Among the materials which may be used are polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxy-terminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraallyloxyethane and divinyl adipate, butane divinyl ether and divinylbenzene. These may be further exemplified as acrylates of primary or polyhydric alcohol or oligoacrylates such as methyl acrylate, ethyl acrylate, propyl acrylate, butyl acrylate, hydroxyethyl acrylate, 2-ethylhexyl acrylate, ethylene glycol diacrylate, trimethylolpropane triacrylate, pentaerythritol triacrylate, epoxy acrylates, oligoester acrylates, urethane acrylates or the like. They may further be exemplified as methacrylates of primary or polyhydric alcohol such as methyl methacrylate, ethyl methacrylate, propyl methacrylate, butyl methacrylate, hydroxyethyl methacrylate, 2-ethylhexyl methacrylate, diethylene glycol dimethacrylate, trimethylolpropane trimethacrylate or the like, or allyl alcohol, diallyl ether, diallyl adipate, diallyl phthalate, both end diallylates of low molecular weight polyurethane or the like. The preferred ethylenically unsaturated monomer, ethylenically unsaturated oligomer or ethylenically unsaturated polymer is a water dispersible acrylate monomer or oligomer. A more preferred ethylenically unsaturated monomer, ethylenically unsaturated oligomer or ethylenically unsaturated polymer comprises a urethane acrylate or an epoxy acrylate.

In one embodiment, the ethylenically unsaturated compound may be present in the gravure ink composition in an amount of from about 30 to about 60 weight percent based on the weigh of the overall ink composition. In another embodiment, the ethylenically unsaturated compound may be present in an ink composition in an amount of from about 40 to about 50 weight percent based on the weight of the overall gravure ink composition.

The gravure printing ink then comprises a defoaming agent. Suitable defoaming agents nonexclusively include silicones, polysiloxanes, polyglycols, and polyalkoxy compounds or combinations thereof. Non-limiting examples of these are FOAMEX 835 which is an emulsion of a polyether siloxane copolymer which contains fumed silica available commercially from Evonik Tego Chemie GmbH of Goldschmidtstrasse 100, D-45127 Essen, Germany; EnviroGem® AE03 which is butanedioic acid, 2,3-dihydroxy-, bis(3-methylbutyl) ester available commercially from Air Products and Chemicals, Inc. of Allentown, Pa. Other defoamers include BYK®-019) (silicone), BYK®-022 (polyglycol), BYK®-024 (polysiloxane) manufactured by Byk-Chemie. In one embodiment, the defoaming agent may be present in the gravure ink composition in an amount of from about 0.25 to about 2 weight percent based on the weigh of the overall ink composition. In another embodiment, the defoaming agent may be present in an ink composition in an amount of from about 0.5 to about 1 weight percent based on the weight of the overall gravure ink composition.

The gravure printing ink then comprises sufficient water to form a dispersion with the other gravure ink components to form a dispersion which has a viscosity of from about 25 cps to about 200 cps, preferably from about 50 cps to about 100 cps.

The gravure print ink may optionally further comprise a one or more optional additional components such as a wetting agent, a wax, talc, a surfactant, a rheology modifier, a silica, a silicone, a disbursing agent, a deaerator, or combinations thereof.

Suitable wetting agents non-exclusively include polysiloxanes, polyacrylics, linear and branched polyalkoxyalate compounds, or combinations thereof, which when present are in amounts of from about 0.25 weight percent to about 2 weight percent, preferably from about 0.5 weight percent to about 1 weight percent.

Suitable waxes non-exclusively include polyethylene waxes, polyamide waxes, Teflon waxes, Carnauba waxes, or combinations thereof, which when present are in amounts of from about 0.1 weight percent to about 1 weight percent, preferably from about 0.25 weight percent to about 0.5 weight percent.

Suitable talcs non-exclusively include with median particle size of from about 0.8 to about 2.4 microns, which when present are in amounts of from about 0 weight percent to about 2 weight percent, preferably from about 0.5 weight percent to about 1 weight percent.

Suitable surfactants non-exclusively amphoteric surfactants such as an alkoxylated compound, a pyrrolidone compound, a polyacrylic polymer, or combinations thereof, which when present are in amounts of from about 0.5 weight percent to about 3 weight percent, preferably from about 0.2 weight percent to about 1 weight percent.

Suitable rheology modifiers non-exclusively include urea based polymeric particles, polyurethanes or polyvinyl pyrrolidone resin with molecular weight range of from about 6,000 to about 900,000, which when present are in amounts of from about 0.2 weight percent to about 5 weight percent, preferably from about 0.2 weight percent to about 2 weight percent.

Suitable silicas non-exclusively include fumed silica or amorphous silica gels, with surface area of from about 50 to about 800 $m^2/g$, which when present are in amounts of from about 0.5 weight percent to about 3 weight percent, preferably from about 0.5 weight percent to about 2 weight percent.

Suitable silicones non-exclusively include polysiloxanes and their derivatives, which when present are in amounts of from about 0.2 weight percent to about 2 weight percent, preferably from about 0.2 weight percent to about 1 weight percent.

Suitable disbursing agents non-exclusively include propylene and ethylene oxide polymeric derivatives, polysiloxane compounds, styrene-maleic anhydride and acrylic resins, which when present are in amounts of from about 0.5 weight percent to about 10 weight percent, preferably from about 0.5 weight percent to about 3 weight percent.

Suitable deaerators non-exclusively include polysiloxane derivatives, and polyalkoxylates, which when present are in amounts of from about 0.1 weight percent to about 0.7 weight percent, preferably from about 0.1 weight percent to about 0.4 weight percent.

The gravure ink composition is essentially free from any volatile organic compounds such as organic solvents, inorganic solvents, amines and photoinitiators. The presence of these unwanted components would cause high layer surface tension, entrapment of air, inconsistency during printing, layer foaming, inability to control viscosity of the layer, as well as evaporation loss. The presence of these volatile components would require constant temperature control and viscosity monitoring. These volatiles also do not allow consistent application to the surface of a substrate at high speeds. Fluidity of the inks and coating are from the ethylenically unsaturated component only, rather than from any added solvent. Preferably the gravure ink is substantially absent of organic solvents, inorganic solvents, amines and photoinitiators. While up to a maximum of 10% volatile components may be tolerated, it preferably has less than 1% volatile components, and more preferably has 0% volatile components. In one embodiment, the ink should have about 50 parts per billion or less of volatile components. This the gravure printing ink of this invention may optionally contain a small amount of organic solvents e.g., isopropyl alcohol, acetone or similar other solvents as ink diluents, however, in a preferred embodiment the gravure print ink has about 0 wt. % of organic solvents, inorganic solvents, amines and photoinitiators.

The inks are imagewise applied sequentially to form a multi-color image on a substrate using an engraved, gravure type anilox printing roller as is well known in the art. Individual ink layers are transferred from the anilox roller onto the surface of a substrate to be printed such as paper, synthetic paper, paperboard, metal foils, non-woven materials, or polymeric films of materials such as polyethylene, polypropylene, polyester, polyamide, polyvinyl chloride, or combinations thereof. According to this invention, by imagewise applied, is meant that each ink is applied as a colored image portion of a final image, where non-colored, non-image areas are between the colored image portions. Thus for a multicolored image, an array of colored dots form each imaged layer, and non-colored, non-inked, non-image areas exits between the dots in each layer. Thus for a typical four-color image, there will be an array of magenta dots separated by uncolored areas, a second array of cyan dots separated by uncolored areas, an array of yellow dots separated by uncolored areas, and an array of black dots separated by uncolored areas. The assimilation of these four colored dot arrays give the final printed image. Thus every colored layer must have both image areas and opposite non-image areas. None of the colored layers are discontinuous full colored layers Various other organic plastic substrates are available having suitable properties for the invention. Illustrative examples includes cellulose derivatives such as cellulose nitrate, cellulose acetate, regenerated cellulose and cellulose ethers such as ethyl and methyl cellulose; polystyrene plastics such as polystyrene and polymers and copolymers of various ring substituted styrenes, for example o-, m- and p-methylstyrene and other ring-substituted styrenes as well as side-chain substituted styrenes such as alpha-, methyl- and ethylstyrene and various other polymerizable and copolymerizable vinylidenes; various vinyl polymers and copolymers such as polyvinyl butyral and other acetals, polyvinyl chloride, polyvinyl acetate and its hydrolysis products, polyvinyl chloride-acetate copolymers; acrylic resins such as polymers and copolymers of methyl acrylate, methyl methacrylate, acrylamide, methylolacrylamide and acrylonitrile; polyamide, polyphenylene sulfide, polyetheretherketone, polyetherketone, polyketone, polyetherimide, polysulfone, polyethersulfone, polyaryletherketone, polyurethane, polyethylene napthalate, polybutylene terephthalate), polyethylene terephthalate, polyamide, polycarbonate, COC, polyoxymethylene, acrylonitrile butadiene styrene, polyvinylchloride, polyphenylene, polyethylene, ethylene/tetrafluoroethylene, (polytetrafluoroethylene, polyesters and unsaturated-modified polyester resins such as those made by condensation of polycarboxylic acids with polyhydric phenols or modified using unsaturated carboxylic acid and further modified by reacting the alkyd with another monomer; polymers of allyl diglycol carbonate. Practical substrates comprise nitrocellulose, polyurethane, polyester, polyolefins, epoxy, acrylic, amide, vinyl, or combinations thereof. Preferred substrates include polyethylene terephthalate and polypropylene. In a preferred embodiment, the substrate is substantially transparent, in particular, substantially transparent to infrared radiation. The substrate has a thickness which is at least sufficient to maintain its integrity as a self-sustaining film. In one embodiment the substrate has a thickness of from about 5 μm to about 700 μm, preferably from about 12 μm to about 100 μm, and more preferably from about 10 μm to about 50 μm.

Each sequentially applied imaged layer of gravure ink independently has a thickness of from about 1 μm to about 3 μm. Each imaged layer of gravure ink is applied in its uncured form to the substrate or a prior ink layer, and dried at each printing station before application of the next ink layer through a drier, typically forced hot air drier. Such drying may be conducted with an infra-red lamp or similar other heat source. This is typically done with a drying oven or overhead drier at temperatures ranging from about 70° F. to about 302° F. Usually a minimum of two inks layers are applied to a substrate and more usually from 1 to about 10 additional layers are applied onto a substrate via a prior ink layer.

Optionally, but preferably, a top non-imaged, full layer of a coating composition is applied onto the prior imaged layers of gravure ink. The coating composition comprises at least one ethylenically unsaturated monomer, ethylenically unsaturated oligomer or ethylenically unsaturated polymer, which layer is composed of the above mentioned ink components, except for the colorant, although a coloring component is not excluded. Useful top layer coating compositions include Inno-Coat EB coatings from IdeOn, LLC of Hillsborough, N.J. The purpose of such a topcoat could be aesthetics, e.g., matte or gloss finish, or provide functionality, e.g., barrier to moisture or gas, or control surface lubricity of the finished package, or controlling electrical conductivity, or light reflectivity, or UV protection. The top layer coating composition layer has a thickness which is at least sufficient to maintain its integrity as a uniform film. In one embodiment the top layer coating composition layer has a thickness of from about 0.1 μm to about 2 μm, preferably from about 0.5 μm to about 1.5 μm, and more preferably from about 0.7 μm to about 1.2 μm. Optionally, a clear plastic film can be laminated onto the prior ink layers.

The series of imaged layers of gravure ink and optional coating composition layer are then subjected to an electron beam irradiation step which exposes all of the layers simultaneously and radically polymerizes or crosslinks the double bonds of the ethylenically unsaturated components to dryness. Electron beam curing of the ink and coating layers results in highly crosslinked polymer film that is essentially free from any low molecular weight compounds that can migrate into food or other migratory sensitive items.

The electron beam curable ink and coating layers are cured using a suitable electron beam source. Suitable electron beam sources may be obtained commercially from Energy Science, Inc. of Wilmington, Mass.; Advanced Electron Beams Inc. of Wilmington, Mass., or from PCT Engineering System LLC, Davenport, Iowa. The amount of energy absorbed, also known as the dose, is measured in units of MegaRads (MR or Mrad) or kiloGrays (kGy), where one Mrad is 10 kGy, one kGy being equal to 1,000 Joules per kilogram. The electron beam dose should be within the range of from about 10 kGy to about 40 kGy for essentially complete curing. When exposed to an electron beam, the ethylenically unsaturated component polymerizes or crosslinks. The precursor molecules are excited directly by the ionizing electron beam. Therefore no initiator compounds are required, so no residual volatile organic compounds are present in the finished product. Moreover, curing is substantially instantaneous and provides a cure percentage at or near one hundred percent.

FIG. 1 illustrates a four color EB gravure printing press. In the process, an unprinted substrate 1 passes through a series of impression cylinders 2, then gravure cylinders 3; hot air dryers 4; ink fountains 5; and doctor blades 6; an EB curing unit 7, to produce a printed substrate 8.

Figure 2:
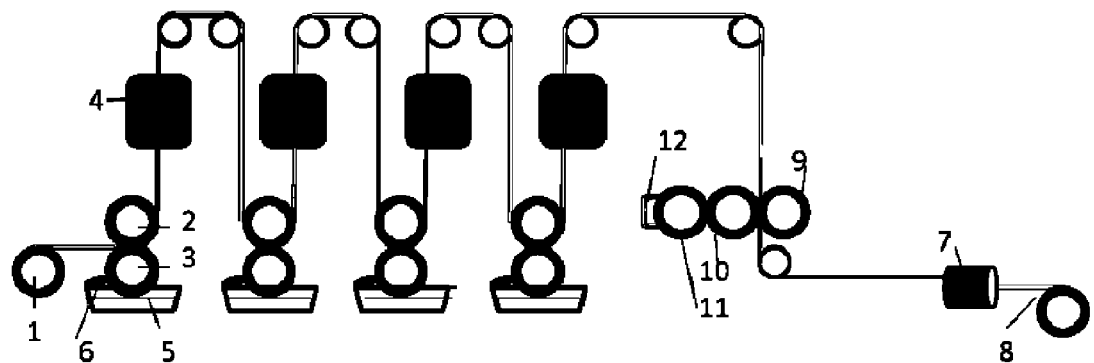
FIG. 2 shows a four color EB gravure printing press with inline EB coater

FIG. 2 shows a four color EB gravure printing press with inline EB coater. In the process, an unprinted substrate 1 passes through a series of impression cylinders 2, then gravure cylinders 3; hot air dryers 4; ink fountains 5; and doctor blades 6. The substrate then passes through a coater impression cylinder 9; a plate 10; an anilox roller 11, a coating chamber 12 and an EB curing unit 7 to produce a printed substrate 8.

Figure 3:
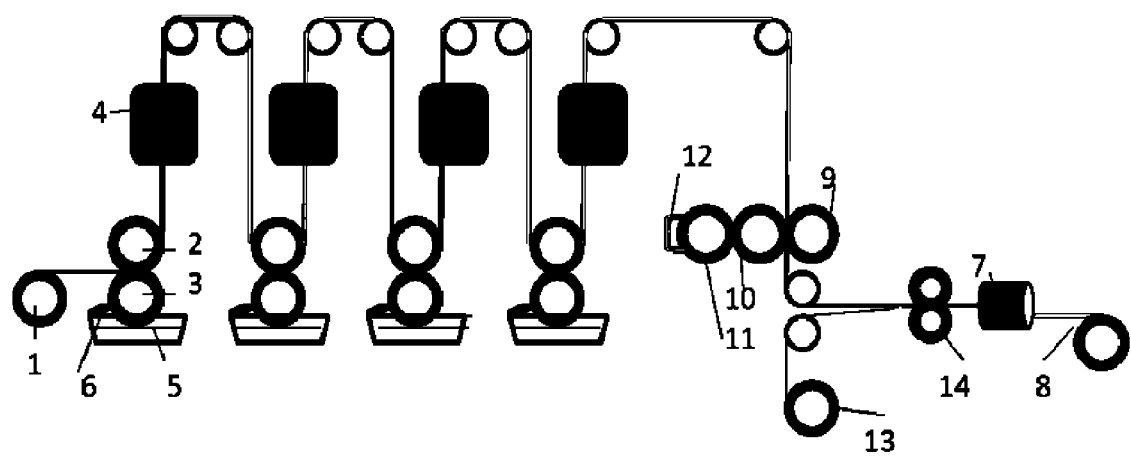
FIG. 3 shows a four color EB gravure printing press with inline EB coater and laminator

FIG. 3 shows a four color EB gravure printing press with inline EB coater and laminator. In the process, an unprinted substrate 1 passes through a series of impression cylinders 2, then gravure cylinders 3; hot air dryers 4; ink fountains 5; and doctor blades 6. The substrate then passes through a coater impression cylinder 9; a plate 10; an anilox roller 11, a coating chamber 12. The substrate is then attached to a clear plastic film from a roll 13 and attached via laminating rollers 14, and finally EB curing unit 7 to produce a printed substrate 8.

The following non-limiting examples serve to illustrate the invention.

EXAMPLES 1-8

The following ink compositions are formulated and tested by the following test protocol. A selected water-based dispersion is mixed with a pigment dispersion and then selected combination of wetting additives, defoamers and deaerators is added to the blend. The prepared gravure inks are applied over a polyester film and dried at ambient conditions. Chemical resistance is tested by rubbing the ink surface with Q-tip socked in IPA (isopropanol), A number of double rubs it takes to cut through the ink layer is an indication of chemical resistance. A dried ink is then exposed to EB irradiation at 100 kV of EB.

| EB Gravure Ink Components | | | | | | | | | | |
|---|---|---|---|---|---|---|---|---|---|---|
| Product | Supplier | Description | EX. 1 | EX. 2 | EX. 3 | EX. 4 | EX. 5 | EX. 6 | EX. 7 | EX. 8 |
| Roshield 3120 | Rohm & Haas | Acrylic w/b dispersion | 58 | | | | | | | |
| NeoRad 440 | DSM Neo Resins | Aliphatic polyurethane | | 59.7 | | | | | | |
| Ucecoat 7177 | Cytec | Polyurethane w/b dispersion | | | 59 | | | | | |
| Ucecoat 7655 | Cytec | Polyurethane Acrylic copolymer w/b dispersion | | | | 58 | | | | |
| LUX 285 | Alberdingk Boley | Polyurethane Acrylic copolymer w/b dispersion | | | | | 59 | | | |
| LUX 241 | Alberdingk Boley | Aliphatic polyether polyurethane w/b dispersion | | | | | | 58.7 | | |
| Laromer 8983 | BASF | Aromatic polyurethane w/b dispersion | | | | | | | 59.5 | |
| Laromer PE 55WN | BASF | Polyester acrylate w/b dispersion | | | | | | | | 59.5 |
| YPD9773 Y14 | Sun Chemical | Yellow 14 pigment dispersion in water | 39 | | | 39 | | | | |
| RPD9975 R269 | Sun Chemical | Red 269 pigment dispersion in water | | 39 | | | 39 | | | |

| EB Gravure Ink Components | | | | | | | | | | |
|---|---|---|---|---|---|---|---|---|---|---|
| Product | Supplier | Description | EX. 1 | EX. 2 | EX. 3 | EX. 4 | EX. 5 | EX. 6 | EX. 7 | EX. 8 |
| BPD9777 | Sun Chemical | Blue 15:4 pigment dispersion in water | | | 39 | | | | 39 | |
| LPD9976 | Sun Chemical | Black 7 pigment dispersion in water | | | | | | 39 | | 39 |
| DynoWet 800 | Altana | Wetting agent | 2 | | | 2 | | 1 | | |
| Surfadone LP100 | ISP | Wetting agent | | 0.3 | | | | | | |
| EnviroGem AEO3 | AirProducts | Wetting and defoaming agent | | | 1 | | 1 | 0.3 | | |
| Foamex 825 | Evonik | defoamer | | | | | | | 0.2 | |
| Airex 901W | Evonik | deairator | | | | | | | 0.3 | |
| DAPRO DF 1760 | Elementis | foam release agent | | | | | | | | 0.5 |
| Slip AYD SL 1606 | Elementis | Polyethylene wax | 1 | 1 | 1 | 1 | 1 | 1 | 1 | 1 |
| Total | | | 100 | 100 | 100 | 100 | 100 | 100 | 100 | 100 |
| Chemical resistance after drying, IPA (Isopropanol) Double Rubs | | | 2-3 | 2 | 1 (tacky after drying) | 2 | 12-13 | 4-5 | 23-26 | 1 |

-continued

| EB Gravure Ink Components | | | | | | | | | | |
|---|---|---|---|---|---|---|---|---|---|---|
| Product | Supplier | Description | EX. 1 | EX. 2 | EX. 3 | EX. 4 | EX. 5 | EX. 6 | EX. 7 | EX. 8 |
| Chemical resistance after EB curing at 30 kGy, 100 kV of EB Dose IPA Double Rubs | | | 7-8 | 40-45 | 55-58 | 45-50 | 40-45 | 10-13 | 70-75 | 50-55 |

EXAMPLE 9

The yellow, red, blue and black inks, according to Examples 1, 2, 3, and 4 are transferred in a selected print image patterns onto a paper web, moving at 500 feet/min, one color at the time in separate gravure printing stations. After the transfer onto the paper surface, each color is exposed to an interstation dryer set at 150° F. as the paper web moves between individual printing stations. When formation of the multi-color print image is completed, the web goes through an electron beam unit set at 100 kV and 30 kGy of EB irradiation dose. After exposure to EB irradiation, the inks, forming the print image undergo rapid free radical polymerization, resulting in improved mechanical abrasion and chemical resistance properties of the print image.

EXAMPLE 10

The print image formed according to Example 9 is coated with an EB curable coating EC13HF, supplied by IdeOn LLC prior to exposure to EB irradiation. After the coating is transferred over the ink, the web is exposed to EB irradiation at 100 kV and 30 kGy, resulting in formation of hard and glossy image with gloss level between 80 and 90 at 60° angle on the Glossmeter from BYK.

EXAMPLE 11

An EB lamination adhesive ELA10 from IdeOn LLC is applied over the print image formed according to Example 9 prior to exposure to EB irradiation. The paper web with the printed image, covered with an EB adhesive and brought into contact with a clear 24 micron thick polypropylene film, supplied by AET by pressing two webs, paper and clear film together between two laminating rollers. Adjacent webs move through the EB curing unit with a polypropylene film positioned on the top side, and exposed to the EB irradiation at 100 kV and 30 kGy. The resulting laminated structure has a very tight bond between paper and film and their mechanical separation leads to the mechanical tear of the film or paper.

EXAMPLE 12

The coated print image according to Example 10 where paper is replaced with a 50 micron thick white polypropylene film from AET and the clear polypropylene film is replaced with 12 micron thick clear polyester film from DuPont.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:
1. A method of printing which comprises:
   I. applying an imaged layer of a gravure printing ink onto a surface of a substrate, which gravure printing ink comprises an admixture of:
      a) a water dispersible pigment;
      b) a water dispersible, ethylenically unsaturated oligomer or ethylenically unsaturated polymer which is polymerizable or crosslinkable by the application of sufficient electron beam radiation;
      c) a defoaming agent;
      d) sufficient water to form a dispersion with components a), b) and c), which dispersion has a viscosity of from about 25 cps to about 200 cps;
   wherein the gravure printing ink comprises about 0% photoinitiator; then
   II. drying the imaged layer of gravure printing ink on the substrate to thereby produce an imaged layer of dry gravure printing ink; and then
   III. conducting steps I and II, one or more additional times before conducting step IV, by applying onto the prior imaged layer of dry gravure printing ink and onto the same surface of the substrate, an imaged layer of another gravure printing ink, which gravure printing ink comprises an admixture of:
      a) a water dispersible pigment;
      b) a water dispersible, ethylenically unsaturated oligomer or ethylenically unsaturated polymer which is polymerizable or crosslinkable by the application of sufficient electron beam radiation;
      c) a defoaming agent;
      d) sufficient water to form a dispersion with components a), b), and c) which dispersion has a viscosity of from about 25 cps to about 200 cps;
   wherein each gravure printing ink comprises about 0 wt. % photoinitiator; and then
   IV. exposing said imaged layers of dry gravure printing ink with sufficient electron beam radiation to cause the ethylenically unsaturated oligomer or ethylenically unsaturated polymer in said imaged layer to polymerize or crosslink.
2. The method of claim 1 wherein each layer of gravure printing ink comprises less than 1% organic solvents, and inorganic solvents.
3. The method of claim 1 wherein in each layer of gravure printing ink ethylenically unsaturated oligomer or ethylenically unsaturated polymer comprises an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof.
4. The method of claim 1 wherein, in each layer of gravure printing ink, the ethylenically unsaturated oligomer or ethylenically unsaturated polymer comprises a urethane acrylate or an epoxy acrylate.
5. The method of claim 1 wherein in each layer of gravure printing ink the defoaming agent comprises a silicone com- pound, a polysiloxane compound, a polyglycol compound, a polyalkoxy compound, or combinations thereof.

6. The method of claim 1 wherein each layer of gravure printing ink further comprises a wetting agent which comprises a polysiloxane compound, a polyacrylic compound, a linear or branched polyalkoxylate compound, or combinations thereof.

7. The method of claim 1 wherein each layer of gravure printing ink further comprises a wax which comprises a polyethylene wax, a polyamide wax, a Teflon wax, a Carnauba wax, or combinations thereof.

8. The method of claim 1 wherein each layer of gravure printing ink further comprises a surfactant which comprises an alkoxylated compound, a pyrrolidone compound, a polyacrylic polymer, or combinations thereof.

9. The method of claim 1 wherein step III is conducted by applying from 1 to about 10 additional imaged layers of gravure printing ink onto a prior imaged layer of gravure printing ink.

10. The method of claim 1 wherein each gravure printing ink further comprises one or more additional components selected from a wetting agent, a wax, talc, a surfactant, a rheology modifier, a silica, a silicone, a disbursing agent, a deaerator, or combinations thereof.

11. The method of claim 1 wherein each gravure printing ink comprises about 0 wt. % of organic solvents, and inorganic solvents.

12. The method of claim 1 wherein the electron beam radiation exposure is at a dose of from about 10 kGy to about 40 kGy.

13. The method of claim 1 further comprising, after step III but before step IV, applying a full layer of a coating composition onto the imaged layer of dry gravure printing ink, which coating composition comprises a water dispersible, ethylenically unsaturated oligomer or ethylenically unsaturated polymer which is polymerizable or crosslinkable by the application of sufficient electron beam radiation.

14. The method of claim 1 wherein each imaged layer of gravure printing ink is imagewise applied to the substrate from an image engraved on a gravure printing roller.

15. The method of claim 1 wherein the substrate comprises paper, synthetic paper, paperboard, metal foils, non-woven materials, or polymeric films of materials such as polyethylene, polypropylene, polyester, polyamide, polyvinyl chloride, or combinations thereof.

16. The method of claim 1 wherein the drying is conducted with an infrared heater.

\* \* \* \* \*